Figure 1:
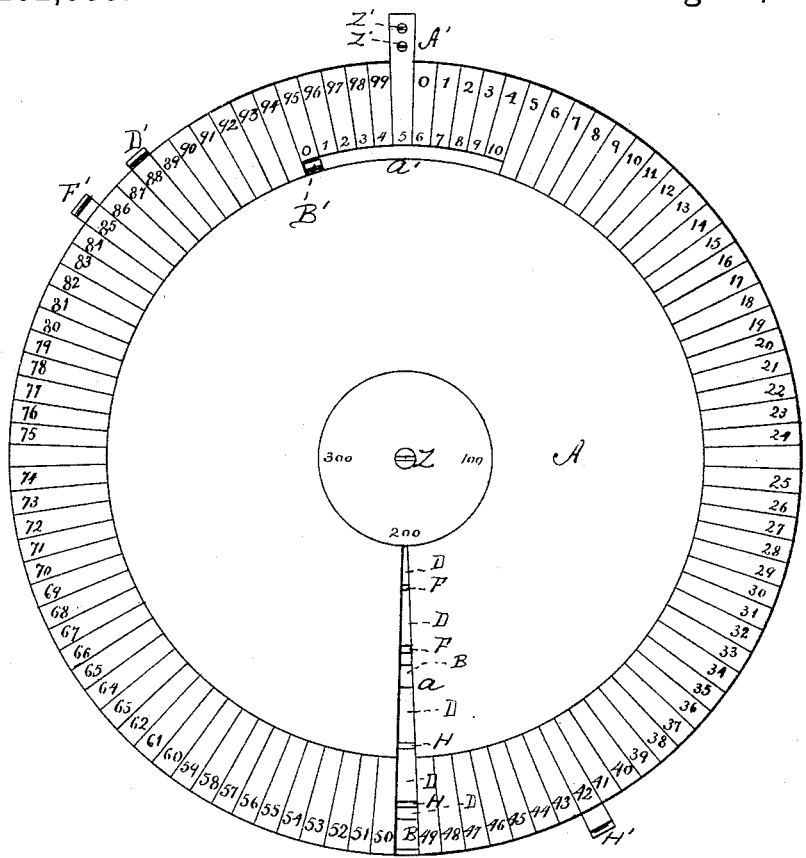

(No Model.) 5 Sheets—Sheet 1.
J. C. ELA.
DEVICE FOR MAKING INTEREST AND OTHER COMPUTATIONS.
No. 262,939. Patented Aug. 22, 1882.

WITNESSES
Joseph Ashbaugh
B. W. Williams

INVENTOR
Jonathan C. Ela
By his Atty.
Henry W. Williams (No Model.) 5 Sheets—Sheet 3.

J. C. ELA.

DEVICE FOR MAKING INTEREST AND OTHER COMPUTATIONS.

No. 262,939. Patented Aug. 22, 1882.

(No Model.) 5 Sheets—Sheet 4.

J. C. ELA.
DEVICE FOR MAKING INTEREST AND OTHER COMPUTATIONS.

No. 262,939. Patented Aug. 22, 1882.

WITNESSES
Joseph Ashbaugh.
D. W. Williams

INVENTOR
Jonathan C. Ela
By his Atty.
Henry W. Williams

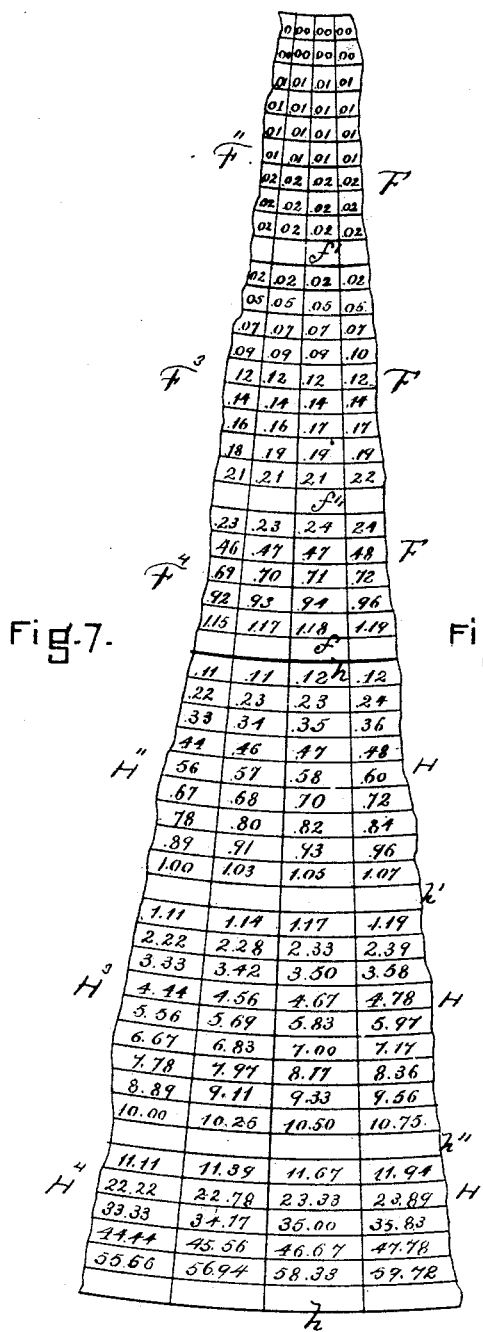

UNITED STATES PATENT OFFICE.

JONATHAN C. ELA, OF BOSTON, MASSACHUSETTS.

DEVICE FOR MAKING INTEREST AND OTHER COMPUTATIONS.

SPECIFICATION forming part of Letters Patent No. 262,939, dated August 22, 1882.

Application filed March 22, 1882. (No model.)

*To all whom it may concern:*

Be it known that I, JONATHAN C. ELA, of Boston, in the county of Suffolk and State of Massachusetts, have invented a new and Improved Device for Making Interest and other Computations, of which the following is a specification.

Although this device may be adapted to computations of various kinds, such as would be useful in tax calculations, &c., yet, as it is perhaps most useful in computing interest, I have shown it in the drawings as applied to the latter purpose.

The device shown and below described is capable of computing interest at one per centum upon amounts from one dollar ($1) to nine thousand nine hundred and ninety-nine dollars, ($9,999,) inclusive, for periods of from one (1) day to one thousand (1,000) days, inclusive.

Figure 2:
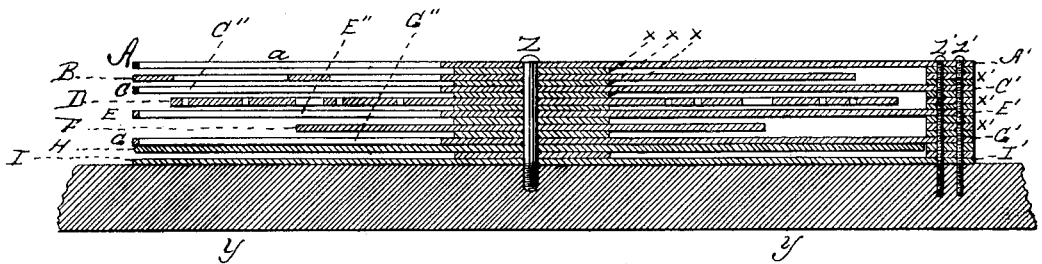
Figure 3:
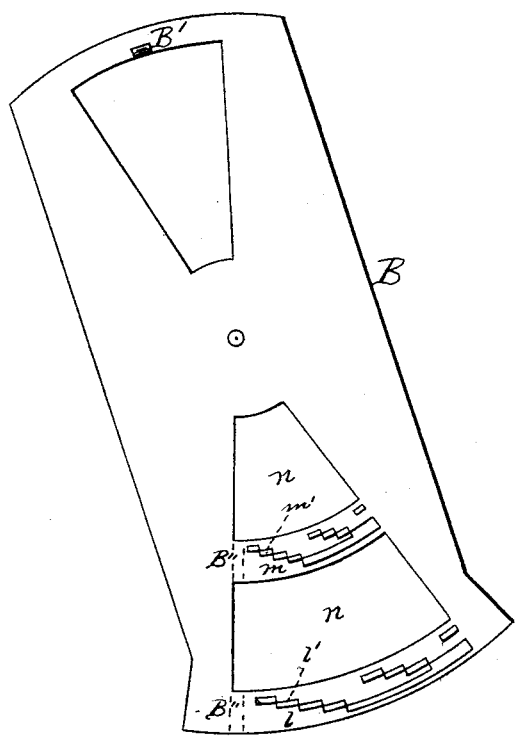
Figure 4:
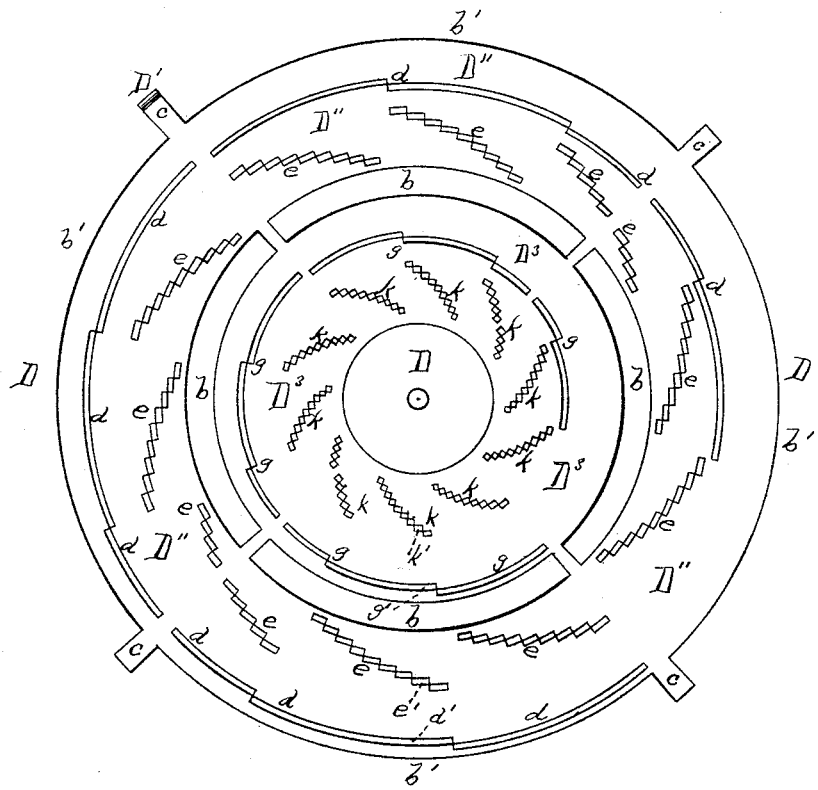
Figure 6:
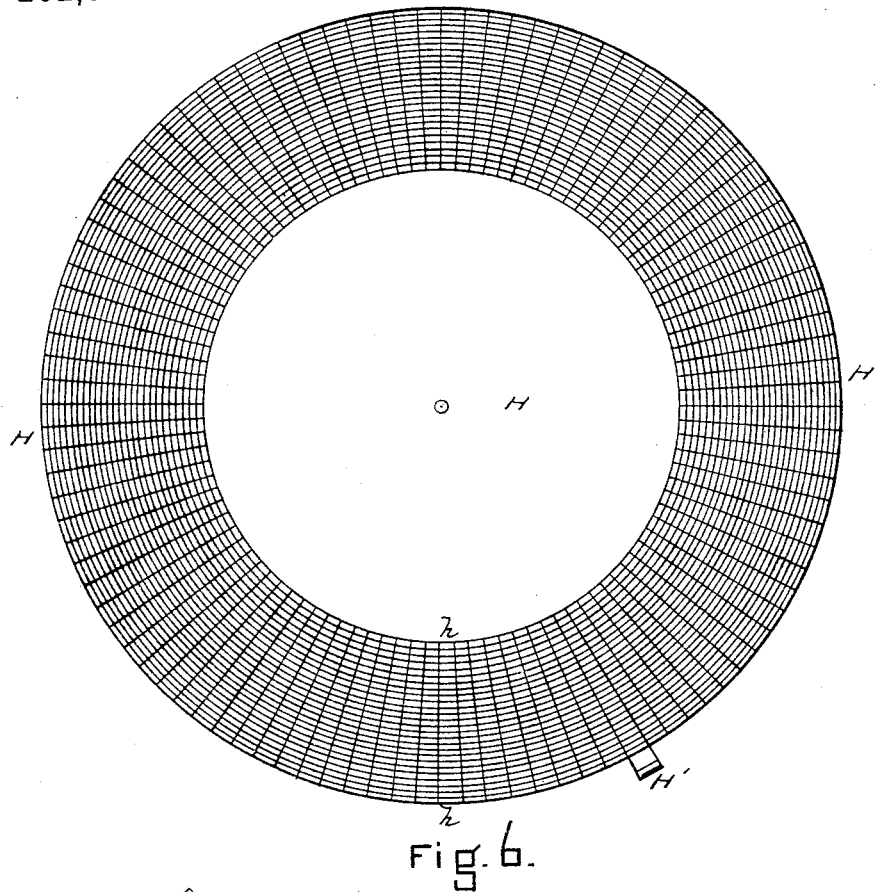
Figure 5:
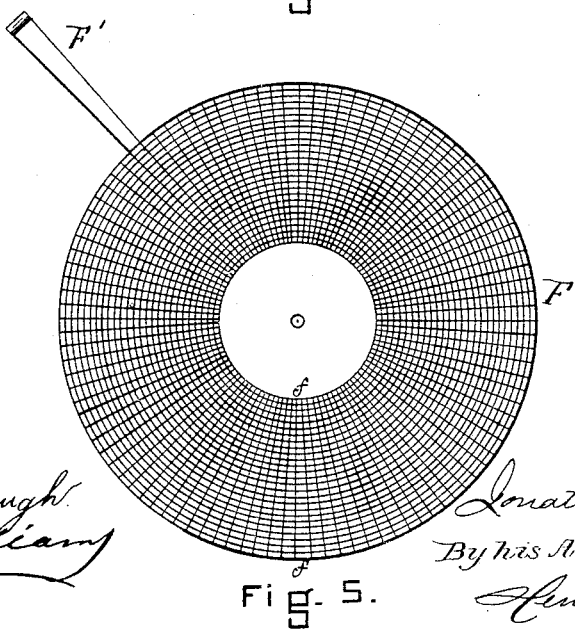

In the accompanying drawings, in which similar letters of reference indicate like parts, Figure 1 is a plan view of my device. Fig. 2 is a vertical section of the same. Fig. 3 is a plan of the sectional disk B. Fig. 4 is a plan of the disk D. Fig. 5 is a plan of the disk F. Fig. 6 is a plan of the disk H. Fig. 7 is an enlarged plan view, showing portions of the disks F and H. Fig. 8 is an enlarged plan view of a portion of the device broken out from Fig. 1.

This device is shown in all the figures (as are all the different parts of it also) in the same position—viz., the position assumed in computing the interest of $4,285 for eighty-eight days at one per centum.

The device consists of a number of disks and washers, the former constructed and inscribed as below specified, and all secured to a suitable base, Y.

A is the dial-disk, provided with the slot $a$. Next below it is the sectional "days-disk" B, (shown in Fig. 3,) and adapted to be rotated by means of the handle B', which projects through the curved slot $a'$ in the dial A. Next below the disk B is a stationary plain disk, C. Next below is the days-disk D, (shown in Fig. 4,) and adapted to be rotated by means of the handle D'. Next is the stationary plain disk E. Next is the "dollars-disk" F, (shown in Fig. 5,) and adapted to be rotated by means of the handle F'. Next is the plain stationary disk G. Next is the dollars-disk H, (shown in Fig. 6,) and adapted to be rotated by means of the handle H'. Last is the stationary plain disk I. Each disk is separated from the next by washers $x$, as shown in Fig. 2, which is a sectional view taken through the slot $a$, and all the disks and washers are secured to the base Y by the screw or pin Z, which forms a pivot for the rotating disks B, D, F, and H. The plain disks C, E, G, and I, which are solely for the purpose of preventing injury by friction to the disks B, D, F, and H, are provided with slots (excepting the lowest one, I) C'' E'' G'' beneath the slot $a$ in the dial A, so as not to hide the disks B D F H; and the dial A and plain disks C E G I are provided with extensions A', C', E', G', and I', by means of which one or more screens, Z', prevent the said dials and disks from rotating by securing them to the base Y. Suitable washers, $x'$, are placed between the said extensions. The handles D' F' H' of their respective disks project beyond the edge of the dial A, so as to be readily moved.

The dial A, near its circumference, is provided with spaces numbered "0" to "99," inclusive, and has also a short series of numbers, "0" to "10," inclusive, arranged concentrically, as shown in Fig. 1. To obtain the amount of interest at one per centum for a given amount and time, move the handle H' under the number on the dial A corresponding to the figures in said amount indicating hundreds and thousands, move the handle F' under the number corresponding to the figures in said amount indicating units and tens, and move the handle D' under the number corresponding to the number of days. For example, to compute the interest of $4,285 for eighty-eight days at one per centum move the handle H' under the number "42," that number corresponding with the figures indicating hundreds and thousands in the amount, move the handle F' under the number "85," that number corresponding with the figures indicating units and tens in the amount, and move the handle D' under the number "88," that number corresponding to the number of days. The numbers then appearing in the slot $a$ (see enlarged Fig. 8) will be .02, .19, .93, and 9.33. The amount sought for is the sum of these numbers—viz., $10.47—the interest of $4,285 at one per centum for eighty-eight days. To compute the interest on the same amount for two hundred and eighty-eight days, move the arms H′, F′, and D′ the same as above described, and then move the arm B′ under "2" over the slot a′. The numbers shown in the slot a′ will then be .02, .19, .47, .93, 9.33, 23.33, the sum of which is $34.27, the amount of the interest of $4,285 for two hundred and eighty-eight days at one per centum. By examining Fig. 7 it will be seen that all the above numbers are in the same radial column formed by the position of the dollars-disks F H. All other numbers in the same column are hidden by the days-disks B D.

The lowest dollars-disk, H, has printed upon it interest-tables at one per centum on from $100 to $9,900, inclusive, in even hundreds only. There are upon it ninety-nine radial columns, giving the interest of $100 to $9,900, inclusive. (See Figs. 6 and 7.) For example, the column marked h in said Figs. 6 and 7 commences with the interest of $4,200 for one day, .12, to nine days, $1.05. Then a space, h′, is left; then the interest of the same amount for ten days, $1.17, to ninety days, $10.50, in even tens; then a space, h″, and below the interest of the same amount from one hundred days, $11.67, to five hundred days, $58.33, in even hundreds. Thus it will be seen that to compute the interest on the amount named—$4,285—the disk H, which has to do with even hundreds only, must be turned so that the column h lies under the slot a in the dial, as this column has the interest-tables for forty-two hundreds. As the time is eighty-eight days, then the numbers wanted in the column are 9.33, the interest for eighty days, and .93, the interest for eight days. The exhibiting and hiding the numbers, however, are the province of the days-disks B D, the dollars-disk H having accomplished its work when its handle H′ has brought its proper column of figures under the slot a.

The other dollars-disk, F, has printed upon it interest-tables at one per centum on $1 to $99, inclusive. There are, as in the disk H, ninety-nine radial columns, which give the interest of from $1 to $99, inclusive. (See Figs. 5 and 7.) For example, the column marked f in said figures commences with the interest of $85 for one day, .00, to nine days, .02. Then a space, f′, is left. Then comes the interest of the same amount for ten days, .02, to ninety days, .21, in even tens. Then a space, f″. Then the interest of the same amount for one hundred days, .24, to five hundred days, $1.18, in even hundreds. Thus in computing the interest on the amount named, $4,285, the disk F, which has to do with units and tens only, must be turned so that the column f lies under the dial-slot a, as this column has the interest-tables for $85. As the time is eighty-eight days, the numbers wanted in this column are .02, the interest for eight days, and .19, the interest for eighty days. Thus these two disks H and F have, by placing their respective handles H′ and F′ under the numbers 42 and 85, respectively exhibited in the slot their columns, which contain the following numbers—viz., .02, .19, .93, 9.33, the sum of which is $10.47, the interest on $4,285 for eighty-eight days. Now, inasmuch as in these same columns are the amounts of interest on $4,285 for not only eighty-eight days, but from one to five hundred days also, it is necessary that all the amounts in said columns not necessary to the computation of the interest on the given number of days (in this instance eighty-eight) should be covered or hidden. This is done by means of the days-disks D and B. The disk D affects (by covering and uncovering when rotated) four of the six concentric sections of figures printed on the disks F H. It affects the sections F″ F³ H″ H³, which include days in units F″ H″ and tens F³ H³, but not the sections F⁴ H⁴, which include days in hundreds—one to five hundred. Broad concentric slots b leave the section F⁴ always exposed, and the concentric spaces b′ between the projections or spurs c leave the section H⁴ exposed. The outer section, D″, of the disk D affects the sections H″ H³ of the disk H, and the inner section, D³, affects the sections F″ F³ of the disk F. The series of concentric slots d is for tens of days, coinciding with section H³ of disk H. The series of slots e is for units of days, coinciding with section H″ of disk H, and the series g k of slots are respectively for tens and units, coinciding with sections F³ and F² of disk F.

Now, to expose the right numbers to compute the interest on $4,285 for eighty-eight days, the dollars-disks F H having been properly rotated, as above described, the disk D is rotated until the handle D′ is under 88 on the dial A, and the result is that the number .02 is left exposed by the slot k′, the number .19 by the slot g′, the number .93 by the slot e′, and the number $9.33 by the slot d′, all these numbers or amounts being in the columns f h, as shown in Fig. 7. It will thus be seen that the units-slot k′ in the section D³ of the days-disk D exposes the amount .02, which is in section F″ of disk F, and is the amount of the interest of $85 for eight days. The tens-slot g′ exposes the amount .19, which is in section F³ of disk F, and is the interest of $85 for eighty days. The units-slot e′ exposes the amount .93 in section H″ of disk H, and which is the interest of $4,200 for eight days, and the tens-slot d′ exposes the amount 9.33 in section H³ of disk H, and which is the interest of $4,200 for eighty days. The sum of all these amounts—$10.47—is therefore the interest of $4,285 for eighty-eight days. There being no hundreds of days to compute interest for the hundreds portions of the radial columns f h—i. e., those portions of said column comprised in sections F⁴ and H⁴ are hidden by the portion B″ of sectional disk B, Fig. 3, whose handle B′ is at zero. (See Fig. 1.) Hence the slot a presents the appearance shown in Fig. 8. The spaces $f'$ $f''$ $h'$ $h''$ between the units and tens and tens and hundreds on the dollars-disks F H correspond with concentric portions of the disk D, in which are no slots, this being necessary in order to preserve the integrity of the latter disk. Radial whole portions radiating toward the projections $c$ in the disk D are also arranged for a similar purpose, and necessitate of course corresponding blank portions in disks F H and dial A. The disk B, made narrow, as its semi-rotation is very short, the handle $B'$ being confined in the slot $a'$ in the dial, is provided with a series of slots, $l$, which affect the hundreds-section $H^4$ in disk H, and a series of slots, $m$, which affect the hundreds-section $F^4$ in disk F. Were the time to be two hundred and eighty-eight days instead of eighty-eight days, then, after going through the process above explained, the handle $B'$ would be placed under the figure 2 next the slot $a'$. The result would be that the slot $m'$ would expose the amount .47 on disk F, (the interest of $85 for two hundred days,) and the slot $l'$ would expose the amount $23.33 on disk H, (the interest of $4,200 for two hundred days.) These two amounts added to those before named would make $34.27, the interest of $4,285 for two hundred and eighty-eight days, and would all, except the total, appear in the slot $a$. The slots $n$ prevent hiding the tens and units on disks F H. In many banking and similar institutions interest is calculated at a fixed per centum. Of course this device could be provided with the figures required to indicate any given per centum; or it may be arranged for one per centum, and another device used for computing different per centums.

It is evident that the device may be adapted for various kinds of computations.

Having thus fully described my invention, what I claim and desire to secure by Letters Patent, is—

1. In combination with the disks F H, the disk D, provided with the concentric slots $b$ and concentric spaces $b'$, with the series of slots $k$ and $g$, arranged as described, in the inner section, $D^3$, of said disk D, and with the series of slots $e$ $d$, arranged as described, in the outer section, $D''$, thereof, all constructed to operate as described, for the purpose set forth.

2. In combination with the disks F H, the disk B, provided with the two series of slots $l$ and $m$, arranged as described, and the large slots $n$ $n$, all constructed to operate as described, for the purpose specified.

3. The combination of the disks F H, slotted disks B D, and dial A, provided with the radial slot $a$ and concentric slot $a'$, and numbered as shown, substantially as and for the purpose set forth.

JONATHAN C. ELA.

Witnesses:
HENRY W. WILLIAMS,
JOSEPH ISHBAUGH.